Nov. 2, 1926.
F. A. CHURCHILL ET AL
1,604,971
BAIT RECEPTACLE
Filed April 19, 1926
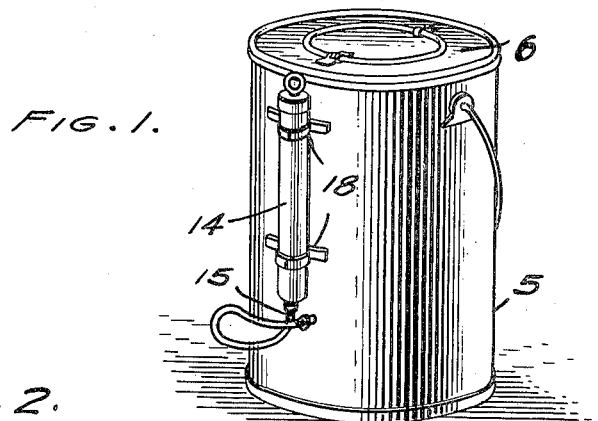
FIG. 1.
FIG. 2.
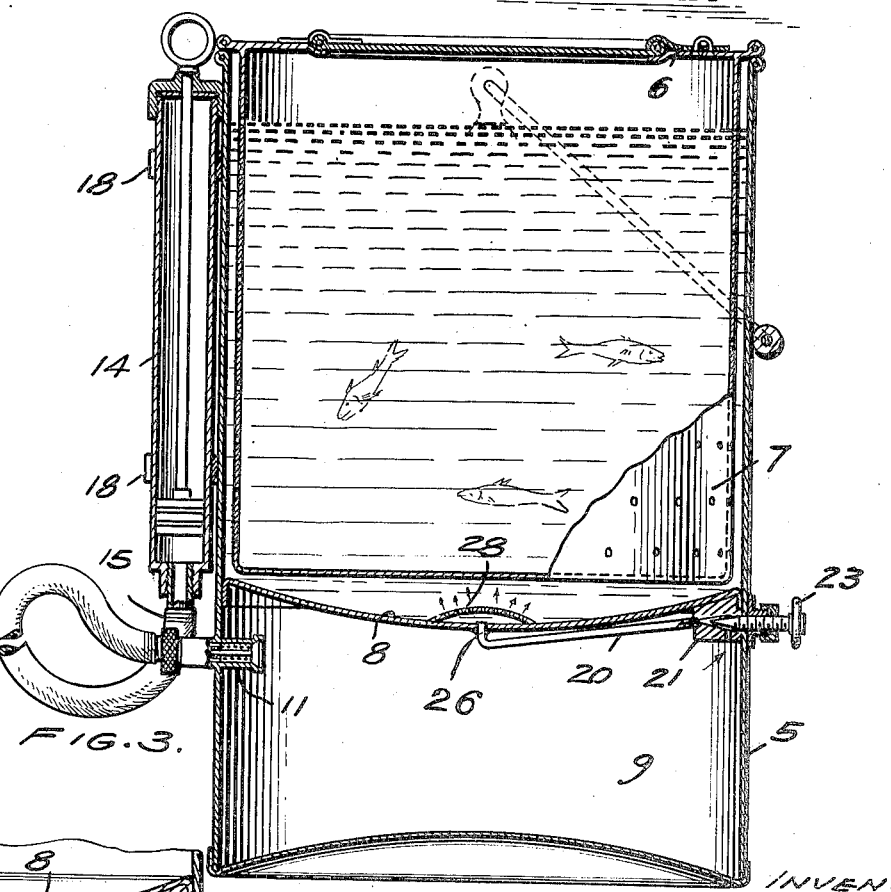
FIG. 3.
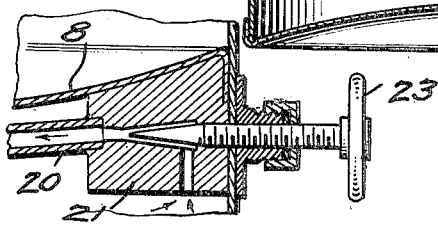
INVENTORS
F. A. CHURCHILL
H. E. BAXTEN
BY Stevens and Batchelor
ATTORNEYS Patented Nov. 2, 1926.

1,604,971

UNITED STATES PATENT OFFICE.

FRANK A. CHURCHILL AND HENRY EVERETT BEXTEN, OF QUINCY, ILLINOIS.

BAIT RECEPTACLE.

Application filed April 19, 1926. Serial No. 103,136.

This invention relates to receptacles for live bait, and the like, and an important object of the invention is to provide simple means whereby a receptacle containing bait and partly filled with water may be supplied with air to prolong the life of the bait over a sufficient period to allow of the use of the bait while alive.

A further and equally important object of the invention is to provide a bait receptacle in which the supply of air to the water containing chamber may be nicely regulated from a point in convenient reach of the operator so that the supply of air may be conserved as circumstances may dictate.

Another object is to provide a receptacle for live bait in which the air chamber is supplied with air through the medium of a valve similar to that employed in automobile and bicycle tires whereby the air chamber may be supplied with air from an air pump at a gasoline filling station or tire repairing station, or supplied with air by means of a hand pump which may be connected to the receptacle.

A further object is to provide a bait receptacle of the character specified which is extremely compact, light in weight, and cheap to manufacture.

Other objects and advantages will be apparent during the course of the following description.

In the accompanying drawing forming a part of this application and in which like minerals are employed to designate like parts throughout the same, Figure 1 is a perspective of the improved receptacle;

Figure 2 is a vertical sectional view through the same, and

Figure 3 is a detail sectional view illustrating a valve embodied in the invention.

In the drawing, wherein for the purpose of illustration is shown a preferred embodiment of the invention, the numeral 5 designates a container having a cover 6 tightly fitted in place and extending over a reticulated basket 7, the basket 7 being adapted to receive bait, or the like.

Attention is directed to Figure 2 which illustrates that the container 5 is provided at a point spaced somewhat below the center thereof with a partition 8 which divides the receptacle into a bait chamber and an air chamber, the air chamber being designated by the numeral 9. Of course, the air chamber 9 is air tight and is provided in one side wall thereof with a valve 11 similar to the valves used in automobile tires, bicycle tires, and the like, so that if convenient the chamber may be filled with air through the medium of an air pump located at a tire repair or a gasoline station. However, a hand pump 14 may be connected with the valve 11 through the medium of a flexible hose 15 and by the actuation of the plunger of the hand pump in the usual and well known manner, the air chamber 9 will be supplied with air. Suitable clips 18 may be employed to detachably connect the hand pump 14 to the receptacle so that the hand pump may be carried along with the receptacle.

Referring now to Figure 2 it will be seen that the concavo-convex partition 8 has connection with a more or less radially arranged tube 20, the outer portion of which has connection with somewhat of a valve casing 21 by means of which a needle valve 23 is supported. The needle valve 23 is accessible from the exterior of the receptacle and controls communication between the air chamber 9 and the bait chamber. The forward portion of the tube 20 is provided with an upwardly directed terminal portion 26 which discharges beneath a perforated spreader member 28 preferably of concavo-convex formation so that the air supplied to the bait chamber is spread throughout the same whereby to keep the bait alive.

With reference to the foregoing description taken in connection with the accompanying drawing it will be seen that a minnow carrier or bait carrier constructed in accordance with this invention is of highly simplified construction and that the employment of the valve 23 provides for the conservation of the air under pressure in the chamber 9.

Of course, the period over which the supply of air to the minnows may be extended is governed to some extent by the pressure of the air in the chamber 9 and the size of the chamber itself. However, it is important to note that by regulation of the needle valve 23, the supply of air may be controlled for extending the discharge of air over a period of about eight hours in a receptacle of approximately the size illustrated.

The inventive idea involved in this application may be carried out in connection with larger containers and containers for various other purposes and it is, therefore, to be understood that the form of invention herewith shown and described is to be taken merely as a preferred example of the same and that such minor changes in arrangement and construction of parts may be made as will remain within the spirit of the invention and the scope of what is claimed.

Having thus described the invention, what is claimed is:

1. The combination with a receptacle having a concavo-convex partition intermediate the upper and lower ends thereof and dividing the receptacle into an air chamber and a water receiving chamber, a reticulated basket received in said water receiving chamber, a valve having communication with said air chamber and adapted for connection with a separate hose whereby the air chamber may be supplied with air from a mechanically operated separate pump, a radially arranged tube having an upstanding terminal portion extended through the central part of said partition, a perforated spreader member of concavo-convex formation extending over the upwardly directed terminal portion of said tube, a valve casing having connection with the outer portion of said tube, and a needle valve associated with said valve casing and controlling the movement of air from said air chamber through said tube to said water receiving chamber, said needle valve being accessible from the exterior of the receptacle.

2. The combination with a receptacle having a concavo-convex partition intermediate the upper and lower ends thereof and dividing the receptacle into an air chamber and a water receiving chamber, a reticulated basket received in said water receiving chamber, a valve having communication with said air chamber and adapted for connection with a separate hose whereby the air chamber may be supplied with air from a mechanically operated separate pump, a radially arranged tube having an upstanding terminal portion extended through the central part of said partition, a perforated spreader member of concavo-convex formation extending over the upwardly directed terminal portion of said tube, a valve casing having connection with the outer portion of said tube, a needle valve associated with said valve casing and controlling the movement of air from said air chamber through said tube to said water receiving chamber, said needle valve being accessible from the exterior of the receptacle, and a cover applied to said water container.

3. The combination with a receptacle having a concavo-convex partition intermediate the upper and lower ends thereof and dividing the receptacle into an air chamber and a water receiving chamber, a reticulated basket received in said water receiving chamber, a valve having communication with said air chamber and adapted for connection with a separate hose whereby the air chamber may be supplied with air from a mechanically operated separate pump, a radially arranged tube having an upstanding terminal portion extended through the central part of said partition, a perforated spreader member of concavo-convex formation extending over the upwardly directed terminal portion of said tube, a valve casing having connection with the outer portion of said tube, a needle valve associated with said valve casing and controlling the movement of air from said air chamber through said tube to said water receiving chamber, said needle valve being accessible from the exterior of the receptacle, a cover applied to said water container, and a hand operated pump detachably connected to said container and adapted for connection with said first-named valve.

In testimony whereof we affix our signatures.

FRANK A. CHURCHILL.
H. EVERETT BEXTEN.